US007859528B2

(12) United States Patent
Cho et al.

(10) Patent No.: US 7,859,528 B2

(45) Date of Patent: Dec. 28, 2010

(54) POWER MODULE FOR ENERGY RECOVERY AND DISCHARGE SUSTAIN OF PLASMA DISPLAY PANEL

(75) Inventors: Byoung-Chul Cho, Bucheon (KR); Jun-Bae Lee, Seoul (KR); Dae-Woong Chung, Bucheon (KR); Bum-Seok Suh, Bucheon (KR)

(73) Assignee: Fairchild Korea Semiconductor, Ltd., Bucheon-Si (KR)

( * ) Notice: Subject to any disclaimer, the term of this patent is extended or adjusted under 35 U.S.C. 154(b) by 873 days.

(21) Appl. No.: 11/787,276

(22) Filed: Apr. 16, 2007

(65) Prior Publication Data

US 2007/0285024 A1 Dec. 13, 2007

(30) Foreign Application Priority Data

Apr. 20, 2006 (KR) ..................... 10-2006-0035935

(51) Int. Cl.
*G06F 3/038* (2006.01)

(52) U.S. Cl. .......................... 345/211; 345/60; 345/67; 315/169.4

(58) Field of Classification Search ............. 345/60–68, 345/211; 315/169.1–169.4; 327/419, 427, 327/434, 437
See application file for complete search history.

(56) References Cited

U.S. PATENT DOCUMENTS 6,906,471 B2 6/2005 Roh et al.
7,046,217 B2 5/2006 Choi
7,053,869 B2 5/2006 Choi
2006/0055635 A1* 3/2006 Choi .......................... 345/60
2006/0125722 A1* 6/2006 Choi .......................... 345/60
2006/0132392 A1* 6/2006 Kong et al. ................... 345/68
2006/0250327 A1* 11/2006 Vossen et al. ................ 345/60
2006/0267875 A1* 11/2006 Chen et al. .................. 345/68
2006/0279483 A1* 12/2006 Tsai et al. ................... 345/67
2007/0057872 A1* 3/2007 Jung et al. ................... 345/68
2007/0085774 A1* 4/2007 Lin et al. ..................... 345/68
2007/0195015 A1* 8/2007 Bezal et al. .................. 345/68

* cited by examiner

*Primary Examiner*—Kimnhung Nguyen
(74) *Attorney, Agent, or Firm*—Sidley Austin LLP

(57) ABSTRACT

A power module for energy recovery and sustain of a plasma display panel is disclosed. The power module includes a first high-voltage integrated circuit which is of a single type, a first switching element for receiving an output from the first high-voltage integrated circuit, and performing a switching operation in response to the output received from the first high-voltage integrated circuit, a first diode connected to one terminal of the first switching element, a second high-voltage integrated circuit which is of a single type, and is arranged symmetrically with the first high-voltage integrated circuit, a second switching element for receiving an output from the second high-voltage integrated circuit, and performing a switching operation in response to the output received from the second high-voltage integrated circuit, and a second diode connected to one terminal of the second switching element.

6 Claims, 4 Drawing Sheets

POWER MODULE FOR ENERGY RECOVERY AND DISCHARGE SUSTAIN OF PLASMA DISPLAY PANEL

CROSS-REFERENCE TO RELATED APPLICATION

This application claims priority to and the benefit of Korea Patent Application No. 10-2006-0035935 filed on Apr. 20, 2006 in the Korean Intellectual Property Office, the entire content of which is incorporated herein by reference.

BACKGROUND

1. Field of the Invention

The present invention relates to a plasma display panel, and, more particularly, to a power module for energy recovery and sustain of a plasma display panel.

2. Description of the Related Art

In a plasma display panel, alternating AC pulses are alternately applied to opposite ends of the panel in accordance with repeated charge and discharge operations until a discharge initiation voltage reaches a critical voltage. The plasma display panel starts generating visible light by gas discharge, when the discharge initiation voltage reaches the critical voltage. The AC pulse voltage is called a "sustain voltage". The sustain voltage is generated by a sustain circuit. However, where such a sustain circuit does not perform an energy recovering function, a certain amount of energy is consumed in every interval of a sustain period. This energy consumption increases in proportion to a switching frequency. For this reason, an energy recovering circuit is used in addition to a sustain circuit, in order to minimize the consumption of energy generated in switching operations, and thus, to achieve an enhancement in efficiency.

FIG. 1 is a circuit diagram illustrating circuits for energy recovery and sustain of a general plasma display panel. A plasma display panel 100 may be represented by a plurality of equivalent capacitors respectively corresponding to a plurality of pixels. A scan circuit 110 is connected to the plasma display panel 100, in order to select the equivalent capacitors corresponding to a selected one of the pixels. A charge/discharge waveform adjusting circuit 120, a sustain circuit 130, and an energy recovery circuit 140 are sequentially connected to the scan circuit 110 at one side of the plasma display panel 100. Another sustain circuit 150 and another energy recovery circuit 160 are connected to the other side of the plasma display panel 100. The configuration and operation of the sustain circuit 150 and energy recovery circuit 160 are identical to those of the sustain circuit 130 and energy recovery circuit 140 on the left side of the plasma display panel 100.

The scan circuit 110 can select the equivalent capacitor which corresponds to a selected pixel of the plasma display panel 100. The charge/discharge waveform adjusting circuit 120 can adjust a charge/discharge waveform for charging/discharging the selected equivalent capacitor to a desired waveform. The sustain circuits 130 and 150 can apply a certain voltage to the plasma display panel 100 in order to maintain the plasma display panel 100 in a discharge state. The energy recovery circuits 140 and 160 can perform a switching operation using bidirectional switching elements Q1 and Q2 and an energy recovery capacitor 141 connected to the bidirectional switching elements Q1 and Q2, in order to charge or discharge the plasma display panel 100.

Typical energy recovery circuits 140 and 160 and sustain circuits 130 and 150 are integrated in a single power module, or are built in separate power modules. Where these circuits are integrated in one power module, two half-bridge type high voltage integrated circuits (HVICs) are also included in the power module. One HVIC controls switching elements of the sustain circuits 130 and 150, the other HVIC controls switching elements of the energy recovery circuits 140 and 160. In these architectures additionally a bootstrap capacitor is integrated in the power module. The bootstrap capacitor is connected to one of the switching elements of the energy recovery circuits 140 and 160. A drawback of this design is that it is not easy to control the switching operation of the switching element using the bootstrap capacitor.

In architectures, where the above-mentioned circuits are integrated in separate power modules, the bootstrap capacitor is not integrated in the power module of the energy recovery circuits, but is formed in a separate power module. However, a drawback of designs with separate power modules is the larger chip area.

SUMMARY

Briefly and generally, embodiments of the invention provide a power module for energy recovery and sustain of a plasma display panel which can perform both an energy recovery circuit function and a sustain circuit function, using a single module structure.

In accordance with the present invention, this object can be accomplished by providing a power module for energy recovery and sustain of a plasma display panel comprising: a first high-voltage integrated circuit which is of a single type; a first switching element for receiving an output from the first high-voltage integrated circuit, and performing a switching operation in response to the output received from the first high-voltage integrated circuit; a first diode connected to a terminal of the first switching element; a second high-voltage integrated circuit which is of a single type, and is arranged symmetrically with the first high-voltage integrated circuit; a second switching element for receiving an output from the second high-voltage integrated circuit, and performing a switching operation in response to the output received from the second high-voltage integrated circuit; and a second diode connected to a terminal of the second switching element.

Each of the first and second switching elements may be an active switching element such as a power MOS field effect transistor or an insulating gate bipolar transistor.

The first diode may include an anode connected to an emitter of the first switching element. The second diode may include a cathode connected to a collector of the second switching element.

The first switching element may include a collector, and the first diode may include a cathode, the collector and the cathode constituting a sustain voltage input terminal. The second diode may include an anode, and the second switching element may include an emitter, the anode and the emitter constituting a ground. The first switching element may include an emitter, and the second switching element may include a collector, the emitter and the collector constituting an output terminal.

The collector of the first switching element and the emitter of the second switching element may be connected to an external energy recovery capacitor. The cathode of the first diode and the anode of the second diode may constitute an input/output line.

The power module may further comprise a first buffer arranged between the first high-voltage integrated circuit and the first switching element, and adapted to increase a current output from the first high-voltage integrated circuit, and a second buffer arranged between the second high-voltage integrated circuit and the second switching element, and adapted to increase a current output from the second high-voltage integrated circuit.

BRIEF DESCRIPTION OF THE DRAWINGS

The above objects, and other features and advantages of the present invention will become more apparent after reading the following detailed description when taken in conjunction with the drawings, in which.

DETAILED DESCRIPTION

Figure 2:
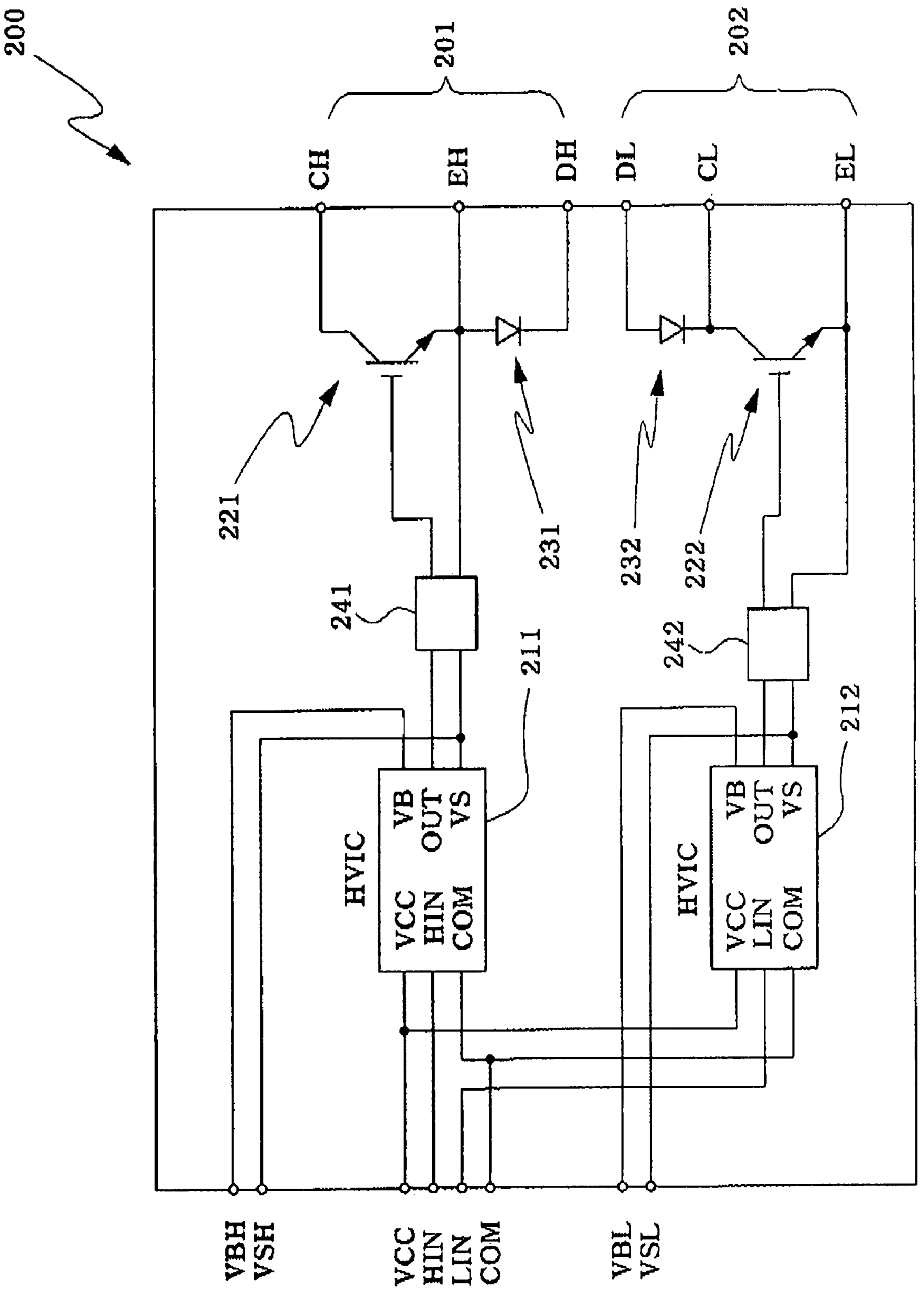
FIG. 2 is a circuit diagram illustrating a power module for energy recovery and sustain of a plasma display panel according to embodiments of the present invention.

FIG. 2 is a circuit diagram illustrating a power module for energy recovery and sustain, for a plasma display panel according to an embodiment of the present invention. A power module 200 for energy recovery and sustain of a plasma display panel can include first and second high voltage integrated circuits (HVICs) 211 and 212, of a single type, first and second switching elements 221 and 222, and first and second diodes 231 and 232. Here, single type HVICs may include HVICs with one output. The first HVIC 211, first switching element 221, and first diode 231 constitute a first circuit 201, the second HVIC 212, second switching element 222, and second diode 232 constitute a second circuit 202. The first and second circuit 201 and 202 can be symmetrically arranged. The first and second HVICs 211 and 212 are capable of carrying sufficiently large currents. In embodiments, where the first and second HVICs 211 and 212 are unable to carry sufficiently large currents, first and second buffers 241 and 242 may be arranged between the first HVIC 211 and the first switching element 221 and between the second HVIC 212 and the second switching element 222, in order to increase current output from the first HVIC 211 and current output from the second HVIC 212, respectively.

The inputs of the power module 200 can include a high-voltage-side floating supply voltage VBH, a high-voltage-side floating supply return voltage VSH, a supply voltage VCC, a logic input HIN for a high-voltage-side gate driver output, a logic input LIN for a low-voltage-side gate driver output, a logic ground/low-voltage-side driver return COM, a low-voltage-side floating supply voltage VBL, and a low-voltage-side floating supply return voltage VSL. The outputs of the power module 200 can include a high-voltage-side collector CH, a high-voltage-side emitter CE, a high-voltage-side diode DH, a low-voltage-side diode DL, a low-voltage-side collector CL, and a low-voltage-side emitter EL.

The input terminals of the first HVIC 211 can include a supply voltage VCC, coupled to the supply voltage VCC of the power module 200, a logic input HIN for a high-voltage-side gate driver output, which is connected to the logic input HIN for a high-voltage-side gate driver output in the power module 200, a logic ground/low-voltage-side driver return COM connected to the logic ground/low-voltage-side driver return COM of the power module 200, a high-voltage-side floating supply voltage VB connected to the high-voltage-side floating supply voltage VBH of the power module 200, and a high-voltage-side floating supply return voltage VS connected to the high-voltage-side floating supply return voltage VSH of the power module 200. The first HVIC 211 can also include an output terminal OUT.

Similarly, the input terminals of the second HVIC 212 can include a supply voltage VCC connected to the supply voltage VCC of the power module 200, a logic input LIN for a low-voltage-side gate driver output, which is connected to the logic input LIN for a low-voltage-side gate driver output in the power module 200, a logic ground/low-voltage-side driver return COM connected to the logic ground/low-voltage-side driver return COM of the power module 200, a low-voltage-side floating supply voltage VB connected to the low-voltage-side floating supply voltage VBL of the power module 200, and a low-voltage-side floating supply return voltage VS connected to the low-voltage-side floating supply return voltage VSL of the power module 200. The second HVIC 212 can include an output terminal OUT.

The first switching element 221 may be a power MOS field effect transistor (MOSFET), an insulating gate bipolar transistor (GBT), or a transistor capable of performing a switching operation similar to that of the power MOSFET or IGBT. The first switching element 221 can include a base connected to the output terminal OUT of the first HVIC 211, a collector connected to the high-voltage-side collector terminal CH of the first HVIC 211, and an emitter connected in common to the low-voltage-side floating supply return voltage VS of the first HVIC 211, an anode of the first diode 231, and the high-voltage-side emitter terminal EH. The cathode of the first diode 231 is also connected to the high-voltage-side diode terminal DH.

Similarly, the second switching element 222 may be a power MOSFET, an IGBT, or a transistor capable of performing a switching operation similar to that of the power MOSFET or IGBT. The second switching element 222 can include a base connected to the output terminal OUT of the second HVIC 212, a collector connected in common to the low-voltage-side floating supply return voltage VS of the second HVIC 212, a cathode of the second diode 232, and the low-voltage-side collector terminal CL, and an emitter connected to the low-voltage-side emitter terminal EL. The anode of the second diode 232 is also connected to the low-voltage-side diode terminal DL.

Figure 3:
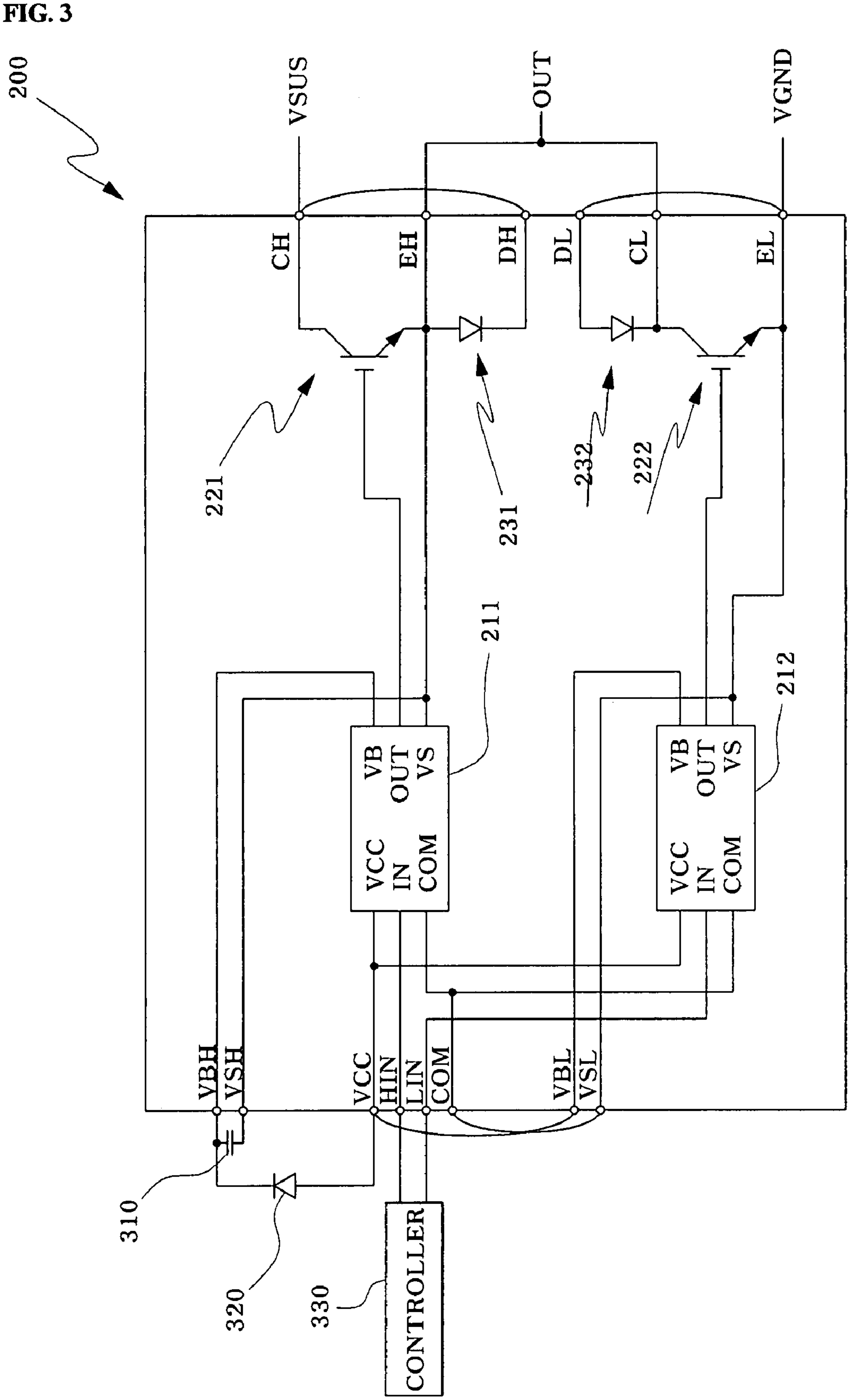
FIG. 3 is a circuit diagram illustrating a sustain circuit operation of the power module shown in FIG. 2.

FIG. 3 is a circuit diagram illustrating a sustain circuit operation of the power module 200, shown in FIG. 2. In FIG. 3, reference numerals identical to those of FIG. 2 designate elements identical to those of FIG. 2, respectively.

In some embodiments, in order to enable the power module 200 to perform a sustain circuit operation, the high-voltage-side collector terminal CH and high-voltage-side diode terminal DH can be short-circuited so that they are used as a common sustain voltage input VSUS. The low-voltage-side diode terminal DL and low-voltage side emitter terminal EL can be short-circuited so that they are used as a common ground VGND. The high-voltage-side emitter terminal EH and low-voltage-side collector terminal CL can be used as the output OUT of the power module 200. Also, a boot-strap capacitor 310 can be arranged between the high-voltage-side floating supply voltage VBH and high-voltage-side floating supply return voltage VSH, which are input terminals of the power module 200. Also, a diode 320 can be arranged between the high-voltage-side floating supply voltage VBH and supply voltage input terminal VCC. The anode of the diode 320 is connected to the supply voltage terminal VCC. The cathode of diode 320 is connected to the high-voltage-side floating supply voltage terminal VBH. In addition, the supply voltage terminal VCC and low-voltage-side floating supply voltage terminal VBL can be short-circuited. The logic ground/low-voltage-side driver return terminal COM and low-voltage-side floating supply return voltage terminal VSL can also be short-circuited. Both the logic input HIN for the high-voltage-side gate driver output and the logic input LIN for the low-voltage-side gate driver output can be connected to a controller 330.

Figure 1:
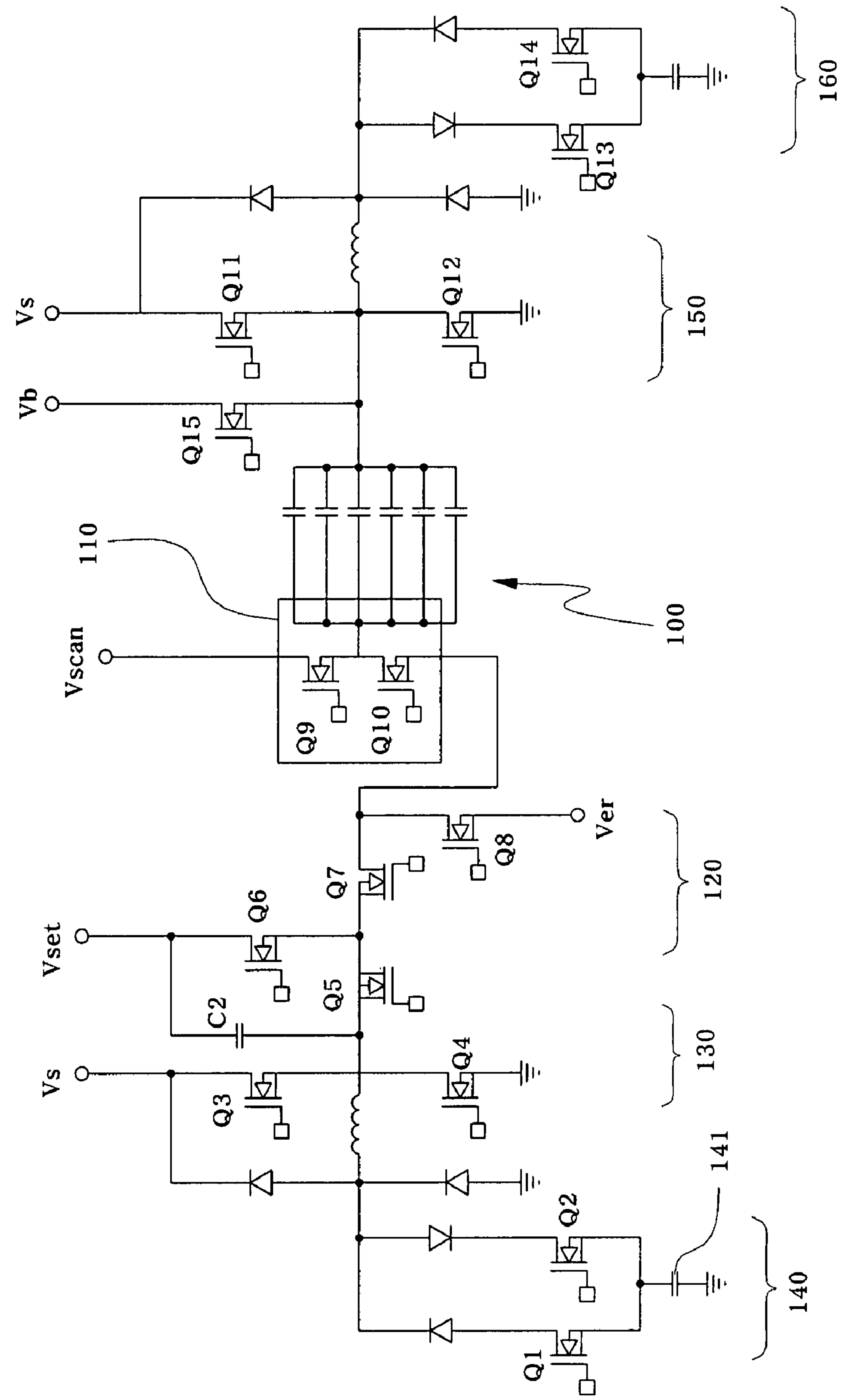
FIG. 1 (PRIOR ART)
FIG. 1 is a circuit diagram illustrating energy recovery and sustain circuits of a general plasma display panel.

In accordance with the above-described configuration, the first and second switching elements 221 and 222 of the power module 200 can function as transistors Q3 and Q4 of a sustain circuit (which may correspond to "130" in FIG. 1), respectively. The first switching element 221 can perform a switching operation in response to an output from the first HVIC 211, whereas the second switching element 222 can perform a switching operation in response to an output from the second HVIC 212. That is, when the first switching element 221 is turned on by the first HVIC 211, a sustain voltage, which can be input to the first switching element 221 via the sustain voltage input terminal VSUS connected to the collector of the first switching element 221, is output to the output terminal OUT via the first switching element 221. The output signal from the output terminal OUT can enable a particular capacitor of the plasma display panel 100 to be maintained in a charge state after being applied to the charge/discharge waveform adjusting circuit 120 and scan circuit 110. On the other hand, when it is desired to discharge a particular capacitor of the plasma display panel 100, the second switching element 222 is first turned on by the second HVIC 212, thereby causing the discharge voltage charged in the particular capacitor to flow to the ground terminal VGND.

Figure 4:
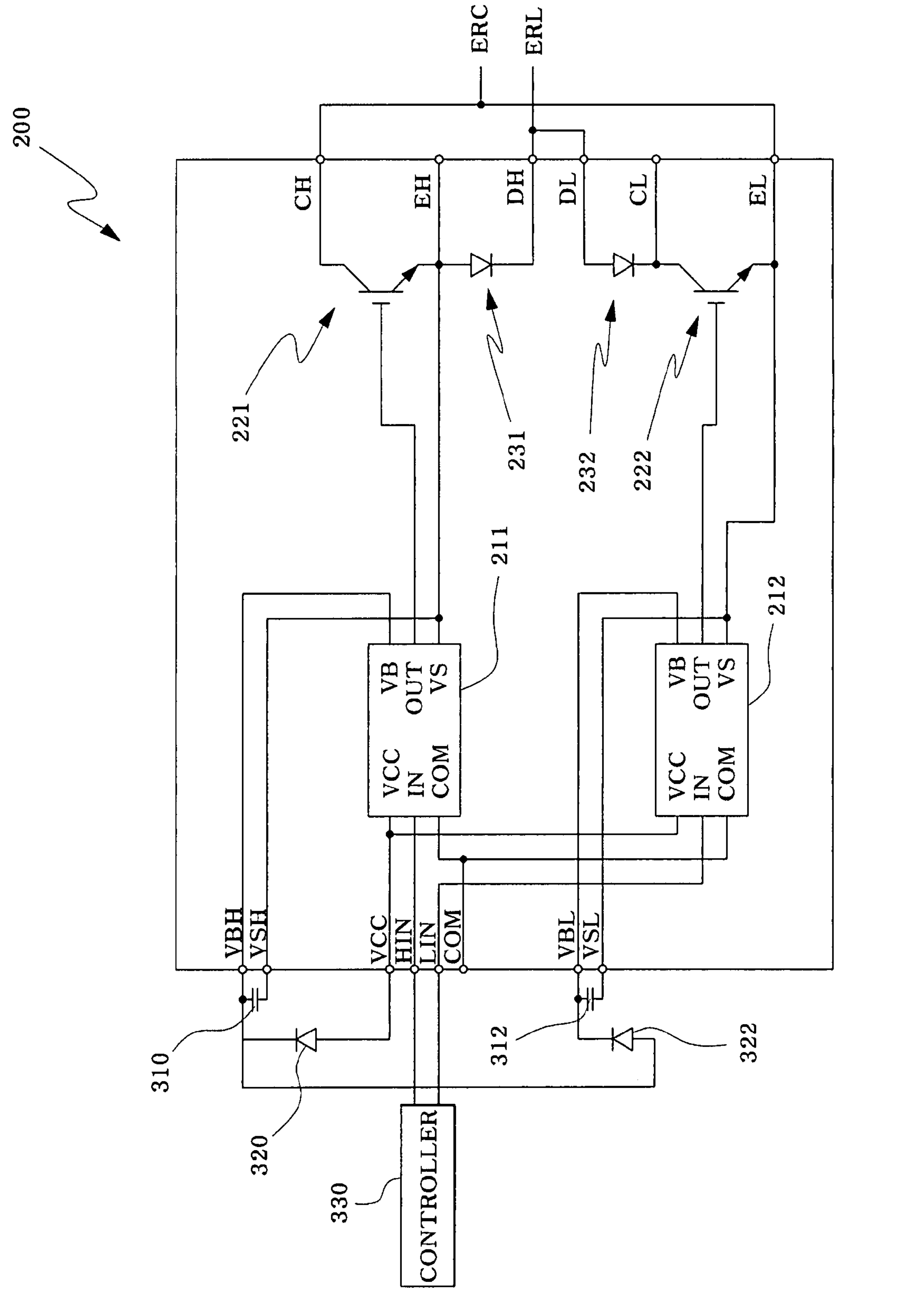
FIG. 4 is a circuit diagram illustrating an energy recovery circuit operation of the power module shown in FIG. 2.

FIG. 4 illustrates an energy recovery circuit operation of the power module 200 shown in FIG. 2. In FIG. 4, reference numerals identical to those of FIG. 2 designate elements identical to those of FIG. 2, respectively.

In some embodiments, in order to enable the power module 200 to perform an energy recovery circuit operation, the high-voltage-side collector terminal CH and low-voltage-side emitter EL, which are outputs of the power module 200, can be short-circuited so that they are used as an output ERC connected to an external energy recovery capacitor (not shown). The high-voltage-side diode terminal DH and low-voltage-side diode terminal DL, which are outputs of the power module 200, can be short-circuited so that they are used as an output ERL connected to an inductor (not shown). Also, similarly to the embodiment of FIG. 3, the boot-strap capacitor 310 can be arranged as a first boot-strap capacitor, between the high-voltage-side floating supply voltage terminal VBH and high-voltage-side floating supply return voltage terminal VSH, which are inputs of the power module 200. The diode 320 can also be arranged, as a first diode, between the high-voltage-side floating supply voltage terminal VBH and supply voltage terminal VCC, which are inputs of the power module 200. The anode of the second diode 320 can be connected to the supply voltage terminal VCC. The cathode of the second diode 320 can be connected to the high-voltage-side floating supply voltage terminal VBH. Also, both the logic input terminal HIN for the high-voltage-side gate driver output and the logic input terminal LIN for the low-voltage-side gate driver output can be connected to the controller 330. In addition, a boot-strap capacitor 312 is arranged between the low-voltage-side floating supply voltage terminal VBL and low-voltage-side floating supply return voltage terminal VSL. A second diode 322 can also be arranged between the low-voltage-side floating supply voltage terminal VBL and high-voltage-side floating supply voltage terminal VBH. The anode of the second diode 322 can be connected to the high-voltage-side floating supply voltage terminal VBH. The cathode of the second diode 322 can be connected to the low-voltage-side floating supply voltage terminal VBL. Although the boot-strap capacitors 310 and 312 are separate from each other in the illustrated embodiment, the second boot-strap capacitor 312 may be dispensed with, as long as the first boot-strap capacitor 310 is configured to additionally have the function of the second boot-strap capacitor 312.

The first and second switching elements 221 and 222 of the power module 200 can function as transistors Q1 and Q2 of an energy recovery circuit (corresponding to "140" in FIG. 1), respectively. The first switching element 221 can perform a switching operation in response to an output from the first HVIC 211, whereas the second switching element 222 can perform a switching operation in response to an output from the second HVIC 212. The switching operations of the first and second switching elements 221 and 222 can be carried out in a bidirectional manner. When the first switching element 221 is turned on by the first HVIC 211, an energy recovery voltage, which is input to the first switching element 221 via the collector of the first switching element 221, can be output to the output terminal ERL via the first switching element 221. The output signal from the output terminal ERL enables a particular capacitor of the plasma display panel 100 to be charged, after being applied to the charge/discharge waveform adjusting circuit 120 and scan circuit 110. On the other hand, when a particular capacitor of the plasma display panel 100 is discharged, the second switching element 222 can be first turned on by the second HVIC 212, thereby causing the discharge voltage to be charged in the energy recovery capacitor.

As apparent from the above description, in the power module for energy recovery and sustain of a plasma display panel according to the present invention, two single type HVICs are integrated in a single module structure, along with two switching elements. In this power module, it is possible to perform a sustain circuit function or an energy recovery function, using an appropriate external wiring. In the above described HVICs it is unnecessary to integrate a separate capacitor in the energy recovery circuit. Also, it is possible to stably perform gate driving of the switching elements. In addition, the power module can be tested using only one tester for mass production because the sustain and energy recovery circuits can be selectively operated using the single power module. Moreover, since the power module has a symmetric circuit structure, it is possible to implement an easy printed circuit board (PCB) layout.

Although certain embodiments of the invention have been disclosed explicitly for illustrative purposes, those skilled in the art will appreciate that various modifications, additions and substitutions are possible without departing from the scope and spirit of the invention as disclosed in the accompanying claims.

What is claimed is:

1. A power module for energy recovery and sustain of a plasma display panel comprising:

a first high-voltage integrated circuit which is of a single type;

a first switching element configured to receive an output from the first high-voltage integrated circuit, and to perform a switching operation in response to the output received from the first high-voltage integrated circuit;

a first diode connected to a terminal of the first switching element;

a second high-voltage integrated circuit which is of a single type, and is arranged symmetrically with the first high-voltage integrated circuit;

a second switching element configured to receive an output from the second high-voltage integrated circuit, and to perform a switching operation in response to the output received from the second high-voltage integrated circuit; and a second diode connected to a terminal of the second switching element.

2. The power module according to claim 1, wherein each of the first and second switching elements is an active switching element.

3. The power module according to claim 1, wherein the first diode includes an anode connected to an emitter of the first switching element, and the second diode includes a cathode connected to a collector of the second switching element.

4. The power module according to claim 1, wherein:

the first switching element includes a collector, and the first diode includes a cathode, the collector and the cathode constituting a sustain voltage input terminal;

the second diode includes an anode, and the second switching element includes an emitter, the anode and the emitter constituting a ground; and the first switching element includes an emitter, and the second switching element includes a collector, the emitter and the collector constituting an output terminal.

5. The power module according to claim 1, wherein:

the first switching element includes a collector, and the second switching element includes an emitter, the collector and the emitter being connected to an external energy recovery capacitor; and the first diode includes a cathode, and the second diode includes an anode, the cathode and the anode constituting an input/output line.

6. The power module according to claim 1, further comprising:

a first buffer arranged between the first high-voltage integrated circuit and the first switching element, and adapted to increase a current output from the first high-voltage integrated circuit; and a second buffer arranged between the second high-voltage integrated circuit and the second switching element, and adapted to increase a current output from the second high-voltage integrated circuit.

* * * * *